United States Patent Office 3,597,430
Patented Aug. 3, 1971

3,597,430
9-AMINO-9-AMINOALKYL DERIVATIVES
OF ACRIDAN
Carl Kaiser, Haddon Heights, N.J., and Charles L. Zirkle, Berwyn, Pa., assignors to Smith Kline & French Laboratories, Philadelphia, Pa.
No Drawing. Filed Feb. 26, 1969, Ser. No. 802,653
Int. Cl. C07d 37/22
U.S. Cl. 260—279
6 Claims

ABSTRACT OF THE DISCLOSURE 9-amino-9-aminoalkyl derivatives of acridan optionally substituted by chlorine, trifluoromethyl or methylthio have neuroleptic and antidepressant activity. The compounds are generally prepared by reaction of a 9-aminoalkyl acridinium acid addition salt with an amine such as ammonia, a lower alkyl amine, benzylamine, phenethylamine, 1-phenyl-2-aminopropane or 2-phenylcyclopropylamine. The acridinium salts are obtained from the corresponding 9-hydroxy-9-aminoalkylacridans by treatment with a mineral acid.

This invention relates to novel substituted 9-amino-9-aminoalkyl derivatives of acridan which have useful pharmacodynamic activity. More specifically the compounds of this invention have neuroleptic and antidepressant activity as demonstrated in standard animal pharmacological test procedures. For example oral administration of a 50 mg./kg. dose to rats produces overt signs of central nervous system depression such as decreased spontaneous motor activity. Further, in mice, oral administration of doses of 25-100 mg./kg. results in stimulation, tenseness and aggressiveness. At these dose levels no toxicity is observed.

The compounds of this invention are represented by the following general structural formula:

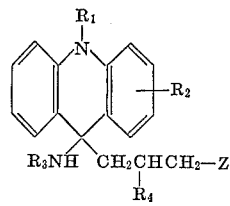

FORMULA I in which:

$R_1$ represents lower alkyl or phenyl;
$R_1$ represents lower alkyl or phenyl;
$R_2$ represents hydrogen, chlorine, trifluoromethyl or methylthio;
$R_3$ represents hydrogen, lower alkyl, benzyl, phenethyl, 1-phenyl-2-propyl or 2-phenylcyclopropyl;
$R_4$ represents hydrogen or methyl; and
Z represents dimethylamino, N-pyrrolidinyl, N-piperidinyl or N'-methyl-N-piperazinyl.

Preferred compounds of this invention are represented by Formula I when $R_1$ is methyl; $R_2$ is chlorine or trifluoromethyl; $R_4$ is hydrogen; and $R_3$ and Z are as defined above.

The term "lower alkyl" where used herein indicates groups having 1-4 carbon atoms, preferably 1-2.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tartaric, salicyclic, citric, glyconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention are generally prepared by treatment of a 9-hydroxy-9-aminoalkyl acridan derivative with acid such as a mineral acid, for example hydrochloric or sulfuric acid, at about 25 to 60° C. for about 10 to 60 minutes which results in dehydration and formation of an acridinium acid addition salt, the latter then reacted with an appropriate amine ($R_3NH_2$) at ambient or room temperature employing a tertiary amine such as triethylamine as a suspending agent. The following scheme illustrates the method of preparation using 9-(3-dimethylaminopropyl)-9-hydroxy-10-methylacridan as a prototype:

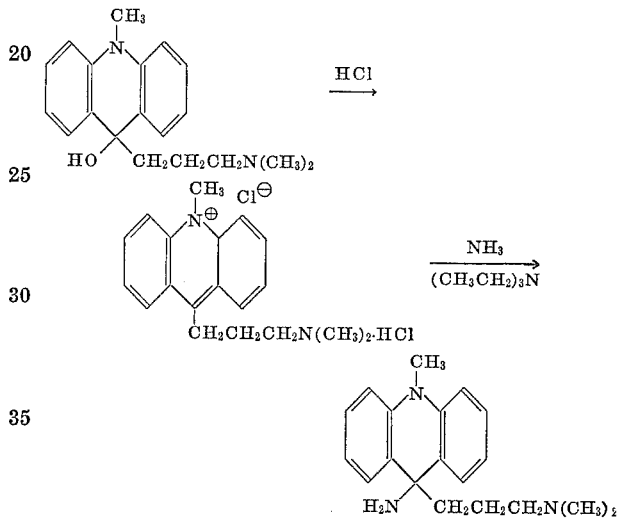

The 9-hydroxy-9-aminoalkyl acridan starting materials used as described above are prepared according to the procedures outlined in U.S. Pat. 3,131,190.

The compounds of this invention may be administered orally or parenterally in conventional dosage unit forms such as tablets, capsules, injectables or the like by incorporating the appropriate dose of a compound of Formula I with carriers according to accepted pharmaceutical practices.

The foregoing is a general description of how to prepare the compounds of this invention. The following examples illustrate the preparation of specific compounds. However this should not be construed as limiting the scope of the invention since appropriate variations in the starting materials will produce other corresponding products set forth hereinabove.

EXAMPLE 1

Gaseous ammonia is introduced into a stirred suspension of 5.0 g. (0.012 m.) of 9-(3-dimethylaminopropyl)-10-methyl-2-trifluoromethylacridinium chloride hydrochloride in 40 ml. of dry triethylamine until the color of the mixture is changed from light yellow to white. The precipitated ammonium chloride is filtered, washed with ether and the filtrate is concentrated in vacuo. The residue crystallizes to give 9-amino-9-(3-dimethylaminopropyl)-10-methyl-2-trifluoromethylacridan, M.P. 74–76° C.

The acridinium chloride hydrochloride starting material is obtained from 9-hydroxy-9-(3-dimethylaminopropyl)-10-methyl-2-trifluoromethylacridan by treatment of an ethanolic solution of the base with excess ethereal hydrogen chloride.

Similarly, reaction with methylamine instead of ammonia yields the corresponding 9-methylamino-9-(3-dimethylaminopropyl)-10-methyl-2-trifluoromethylacridan.

EXAMPLE 2

To a stirred suspension of 8.4 g. (0.02 m.) of 9-(3-dimethylaminopropyl) - 10 - methyl-2-trifluoromethylacridinium chloride hydrochloride in 50 ml. of dry triethylamine is added all at once 2.3 g. (0.017 m.) of d-1-phenyl-2-aminopropane in 5 ml. of triethylamine. The mixture is stirred until color disappears, is filtered and the filtrate concentrated in vacuo. The residue is purified by chromatography to yield 9-(3-dimethylaminopropyl)-9-(d-1-phenyl-2-propylamino) - 10-methyl-2-trifluoromethylacridan.

EXAMPLE 3

Following the general procedure of Example 1, 9-(3-dimethylaminopropyl)-10-methylacridinium chloride hydrochloride is treated with ammonia in triethylamine to give 9-amino-9-(3-dimethylaminopropyl)-10-methylacridan.

Similarly, employing 9-(3-dimethylamino-2-methylpropyl)-10-methylacridinium chloride hydrochloride yields 9 - amino-9-(3-dimethylamino-2-methylpropyl)-10-methylacridan.

The acridinium chloride hydrochlorides are obtained from the corresponding 9-hydroxy acridans upon treatment with excess hydrogen chloride.

EXAMPLE 4

Following the general procedure of Example 2, 9-[3-(N' - methyl - N - piperazinyl) - propyl] - 10 - methylacridinium chloride hydrochloride (obtained from the corresponding 9-hydroxy derivative) is reacted with benzylamine to give 9-(benzylamino)-9-[3-(N'-methyl-N-piperazinyl)-propyl]-10-methylacridan.

Similarly, by employing phenethylamine instead of benzylamine there is obtained 9-(phenethylamino)-9-[3-(N'-methyl-N-piperazinyl)-propyl]-10-methylacridan.

EXAMPLE 5

Following the general procedure of Example 1, 9-(3-dimethylaminopropyl) - 10 - ethylacridinium chloride hydrochloride is reacted with ammonia to give 9-amino-9-(3-dimethylaminopropyl)-10-ethylacridan.

Similarly, using the 10-propyl or 10-butyl substituted acridinium chloride hydrochlorides as described above yields the corresponding 9-amino-9-(3-dimethylaminopropyl)-10-propylacridan and 9-amino-9-(3-dimethylaminopropyl)-10-butylacridan, respectively.

EXAMPLE 6

As outlined in Example 1, a suspension of 2-chloro-9-(3-dimethylaminopropyl)-10-methylacridinium chloride hydrochloride in triethylamine is reacted with ammonia to give 9-amino-2-chloro-9-(3-dimethylaminopropyl)-10-methylacridan.

Similarly, reaction of 9 - (3-dimethylaminopropyl)-2-methylthio-10-methylacridinium chloride hydrochloride with ammonia yields 9 - amino-9-(3-dimethylaminopropyl)-2-methylthio-10-methylacridan.

The acridinium chloride hydrochlorides used as above are obtained from the corresponding 9-hydroxy acridans.

EXAMPLE 7

Following the procedure of Example 1, 9-(3-dimethylaminopropyl) - 10 - phenylacridinium chloride hydrochloride (obtained from the corresponding 9-hydroxy acridan) is treated with ammonia to give upon workup 9-amino-9-(3-dimethylaminopropyl)-10-phenylacridan.

EXAMPLE 8

Following the procedure of Example 2, to a suspension of 9-(3-dimethylaminopropyl)-10-methyl-2-trifluoromethylacridinium chloride hydrochloride in triethylamine is added 2-phenylcyclopropylamine. Upon disappearance of the color, the reaction mixture is filtered and the filtrate evaporated. The residue is purified by chromatography to give 9-(3-dimethylaminopropyl)-9-(2-phenylcyclopropylamino)-10-methyl-2-trifluoromethylacridan.

What is claimed is:

1. A chemical compound having the following structural formula:

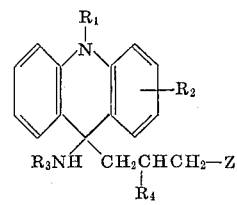

or a pharmaceutically acceptable acid addition salt thereof, wherein:

R₁ is lower alkyl or phenyl;
R₂ is hydrogen, chlorine, trifluoromethyl or methylthio;
R₃ is hydrogen, lower alkyl, benzyl, phenethyl, 1-phenyl-2-propyl or 2-phenylcyclopropyl;
R₄ is hydrogen or methyl; and
Z is dimethylamino, N-pyrrolidinyl, N-piperidinyl or N'-methyl-N-piperazinyl;

said lower alkyl moieties each having from 1 to 4 carbon atoms.

2. A chemical compound according to claim 1 in which R₁ is methyl and R₄ is hydrogen.

3. A chemical compound according to claim 2 in which R₃ is hydrogen.

4. A chemical compound according to claim 3 in which Z is dimethylamino.

5. A chemical compound according to claim 4 in which R₂ is hydrogen.

6. A chemical compound according to claim 4 in which R₂ is 2-trifluoromethyl.

References Cited

UNITED STATES PATENTS 2,083,908   6/1937   Hata et al. _____ 260—208X
3,131,190   4/1964   Zuhle _____ 260—279

DONALD G. DAUS, Primary Examiner

U.S. Cl. X.R.

260—268; 424—250, 257